United States Patent [19]

Okamura et al.

[11] Patent Number: 5,462,816
[45] Date of Patent: Oct. 31, 1995

[54] AIR CELL

[75] Inventors: Okiyoshi Okamura, Hiroshima; Katsuma Sakai; Mitsunori Yoshimura, both of Yamaguchi, all of Japan

[73] Assignee: Koa Oil Company, Ltd., Tokyo, Japan

[21] Appl. No.: 329,880

[22] Filed: Oct. 27, 1994

[30] Foreign Application Priority Data

Oct. 29, 1993 [JP] Japan .................................. 5-272502

[51] Int. Cl.⁶ ................................................ H01M 8/24
[52] U.S. Cl. ..................... 429/18; 429/12; 429/27; 429/28; 429/33; 429/34; 429/72
[58] Field of Search ........................ 429/12, 14, 18, 429/27, 28, 33, 34, 72

[56] References Cited

U.S. PATENT DOCUMENTS 5,240,785  8/1993  Okamura et al. .................... 429/27

*Primary Examiner*—John Niebling
*Assistant Examiner*—Bruce F. Bell
*Attorney, Agent, or Firm*—Wenderoth, Lind & Ponack

[57] ABSTRACT

An air cell having a single cell or a plurality of cells being aggregated is disclosed, that comprises a positive electrode, a negative electrode, a separator disposed between the positive electrode and the negative electrode and composed of a water absorbing material that absorbs and holds an electrolytic solution, an electrolytic solution supply member protrusively disposed at a lower edge of the positive electrode and the negative electrode and adapted for supplying the electrolytic solution to the separator, a spacer for covering an outer surface of the positive electrode and the negative electrode and forming an air layer on the front surface thereof, and a cover member for covering surfaces of the electrolytic solution supply member, the cover member having a blank portion that is at least a minimum opening portion for supplying the electrolytic solution to the electrolytic solution supply member.

11 Claims, 7 Drawing Sheets

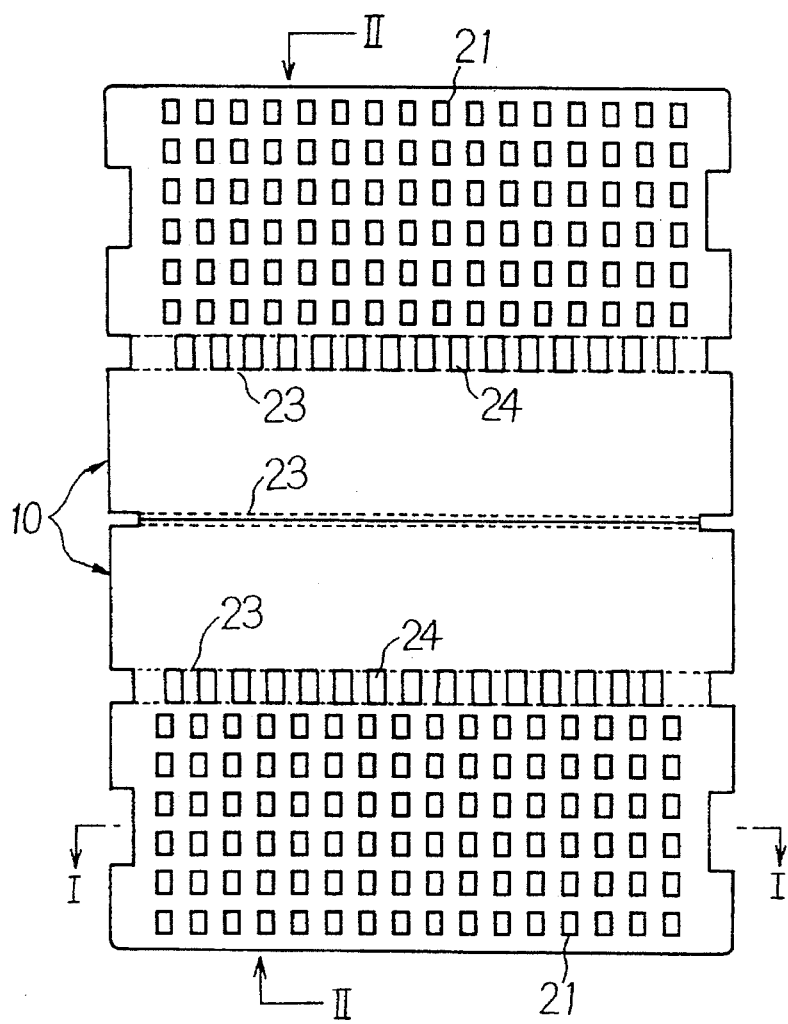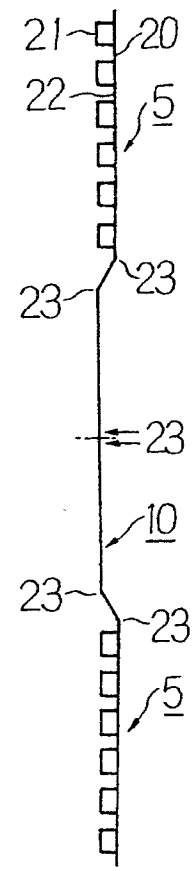
FIG. 4(a)  FIG. 4(c)
FIG. 4(b)

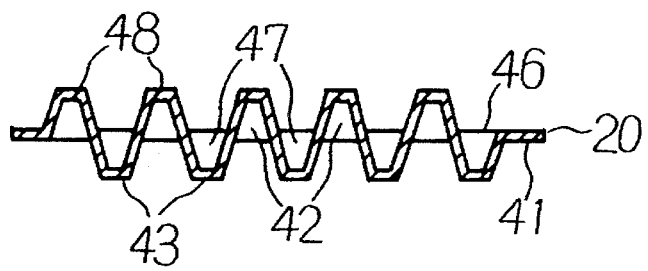
F I G. 6 (a)
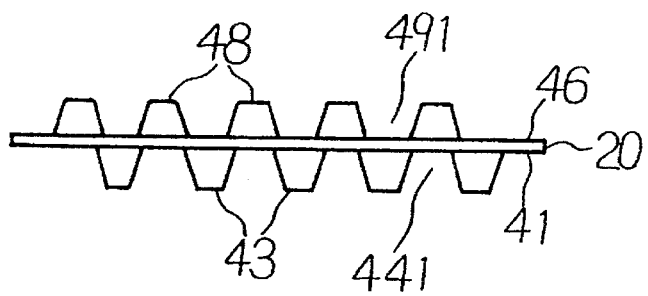
F I G. 6 (b)
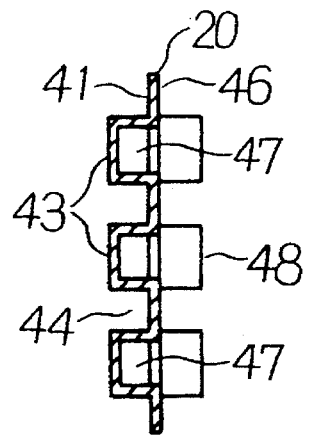 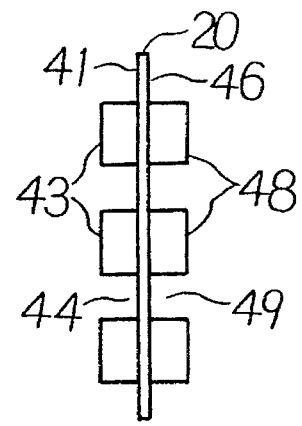
F I G. 7(a)  F I G. 7(b)

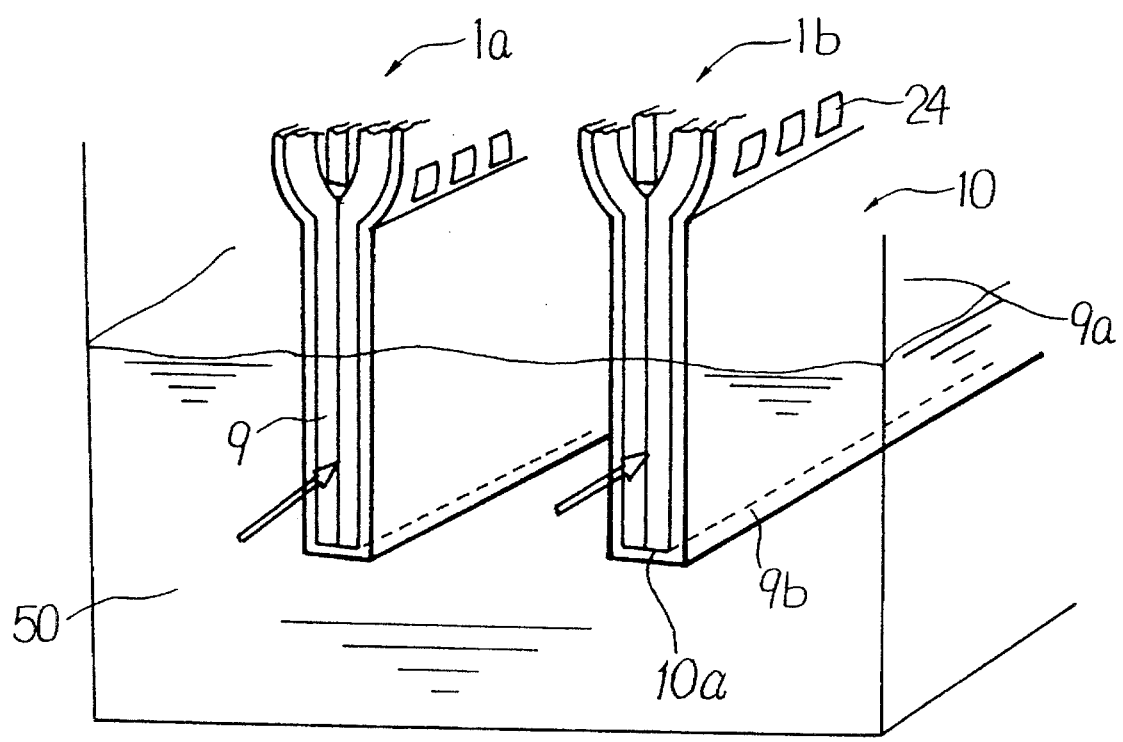
F I G. 8

AIR CELL

BACKGROUND OF THE INVENTION

1. Field of the Invention

The present invention relates to an air cell constructed of a single cell or a plurality of connected cells, in particular, an air cell that is easily activated with electrolytic solution being poured thereto.

2. Description of the Related Art

The applicant of the present invention proposed an aggregated-cell type air cell in which a plurality of cells are assembled can prevent a liquid junction that a positive electrode (a cathode in case of discharging electricity) of a cell and a negative electrode (an anode in case of discharging electricity) of the adjacent cell thereof are shortcircuited through an electrolytic solution. This air cell was disclosed as Japanese Patent Laid-Open Publication No. 2-265175. This air cell comprises a case which has a plurality of air ventilation windows, a plurality of cells which are accommodated in the case, and an electrolytic solution tank which is disposed at the bottom of the case, the electrolytic solution tank being filled with a water absorbing material that absorbs and holds an electrolytic solution and being partitioned into a plurality of tanks that correspond to the respective cells. This air cell is of nearly full-open type and the cells which receive an electrolytic solution from the respective tanks which are separated from each other are connected in series. Thus, even if the cells are connected in series, the liquid junction of the electrolytic solution does not take place. Consequently, the output voltage of the air cell can stably output an electric power. In brief, the partition provided at the bottom of the case allows that the leak current (liquid junction) can be prevented.

However, when such a conventional air cell is used, water or salt water should be equally filled into the partitioned electrolytic solution tank with care not to overflow it from the partitions. Thus, the water filling operation is relatively troublesome. In addition, the process for providing the partitions at the bottom of the case and filling each of the partitions with the water absorbing material is complicated and thereby the production cost is increased.

SUMMARY OF THE INVENTION

An object of the present invention is to solve the above-described problem and provide a single-cell type air cell (hereinafter also referred to as "a single cell") and an aggregated-cell type air cell (hereinafter also referred to as "an aggregated cell") constructed of a plurality of cells that can suppress the liquid junction between adjacent cells, that can be easily used, and that can be produced at low cost.

Another object of the present invention is to provide a single-cell type air cell and an aggregated-cell type air cell constructed of a plurality of cells that do not need a vessel for storing an electrolytic solution.

A first aspect of the present invention is a single-cell type air cell, comprising a positive electrode, a negative electrode, a separator disposed between the positive electrode and the negative electrode and composed of a water absorbing material that absorbs and holds an electrolytic solution, an electrolytic solution supply member protrusively disposed at a lower edge of the positive electrode and the negative electrode and adapted for supplying the electrolytic solution to the separator, a spacer for covering an outer surface of the positive electrode and the negative electrode and forming an air layer on the front surface thereof, and a cover member for covering surfaces of the electrolytic solution supply member, the cover member having a blank portion that is at least a minimum opening portion for supplying the electrolytic solution to the electrolytic solution supply member.

A second aspect of the present invention is an air cell having a plurality of cells aggregated, each of which is connected through the spacer and the cover member.

In the process of the invention of the effective single-cell type air cell and aggregated-cell type air cell, it was known that it is important to substantially suppress a shunt current that flows in electrolytic solution soaking portions of adjacent cells so as to allow an output current to constantly flow for a predetermined time period (as will be shown in FIG. 9). To solve the problem, an electrolytic solution soaking portion (electrolytic solution supply member) with a new construction is provided. In other words, the electrolytic solution supply member of a separator for the adjacent cells absorbs an electrolytic solution and supplies it to both electrodes of the cells by capillary action. In addition, since the most surface of the electrolytic solution supply member is covered with a cover member made of an insulation sheet, the shunt current that flows between the adjacent electrolytic solution supply members can be substantially suppressed.

These and other objects, features and advantages of the present invention will become more apparent in light of the following detailed description of best mode embodiments thereof, as illustrated in the accompanying drawings.

BRIEF DESCRIPTION OF DRAWINGS

FIG. 4(a) is a developed view showing an embodiment of a spacer and a cover member for use with the air cell according to the present invention;

FIG. 4(b) is a horizontal sectional view taken along line I—I of FIG. 4(a);

FIG. 4(c) is a vertical sectional view taken along line II—II of FIG. 4(a);

FIG. 6(a) is a horizontal sectional view taken along line V—V of FIG. 5;

FIG. 6(b) is a plan view of FIG. 5;

FIG. 7(a) is a vertical sectional view taken along line VI—VI of FIG. 5;

FIG. 7(b) is a right side view of FIG. 5;

FIG. 8 is a partial perspective view showing the air cell of the present invention that is soaked in an electrolytic solution.

DESCRIPTION OF PREFERRED EMBODIMENTS

Next, with reference to the accompanying drawings, embodiments of the present invention will be described.

Figure 1:
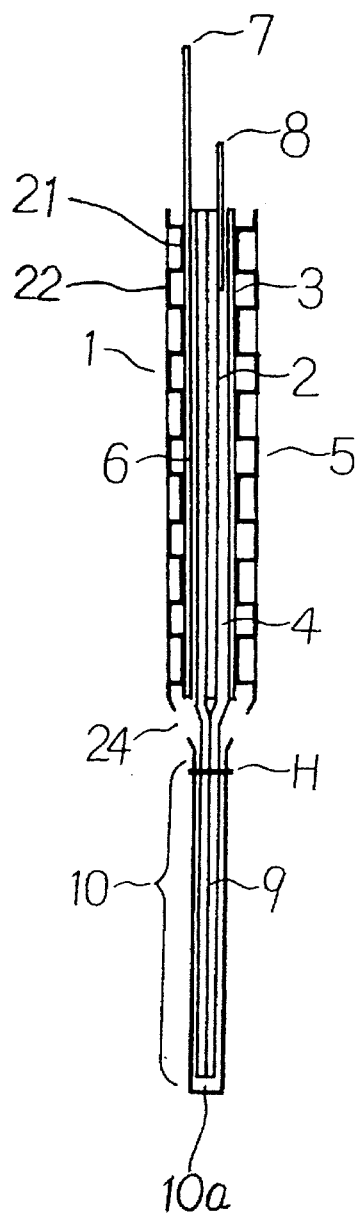
FIG. 1 is a sectional view showing an embodiment of a single-cell type air cell according to the present invention.

FIG. 1 is a sectional view showing an embodiment of a single-cell type air cell 1 according to the present invention. Referring to FIG. 1, the single cell 1 comprises a negative electrode 2, a positive electrode 3, a separator 4, a spacer 5, a current collector 6, a positive electrode current collector terminal 7, a negative electrode current collector terminal 8, an electrolytic solution supply member 9, and a cover member 10. The negative electrode 2 is formed in a plane shape. The positive electrode 3 surrounds both sides of the negative electrode 2. The separator 4 is disposed between the negative electrode 2 and the positive electrode 3. The spacer 5 surrounds the outside of the positive electrode 3. The current collector 6 is disposed in contact with the positive electrode 3. The positive electrode current collector terminal 7 is connected to the current collector 6. The negative electrode current collector terminal 8 is connected to the negative electrode 2. The electrolytic solution supply member 9 is integrally formed along with the separator 4. The cover member 10 is integrally formed along with the spacer 5.

The negative electrode 2 may be composed of magnesium, an alloy thereof, zinc, an alloy thereof, aluminum, an alloy thereof, or the like. The negative electrode current collector terminal 8 is connected to an edge portion of the negative electrode 2 by mechanical press-fit method, welding, or the like.

The separator 4 is composed of a water absorbing material where water repellent treatment is not performed. An example of the separator 4 is a glass paper. The separator 4 insulates the positive electrode (current collector 6) and the negative electrode 2. In addition, the separator 4 absorbs an electrolytic solution, which is for example KCl solution or NaCl solution, from the electrolytic solution supply member 9 by capillary action and thereby moistens the negative electrode 2 and the positive electrode 3. The material of the separator 4 and the electrolytic solution supply member 9 may be another water absorbing materials such as glass fibers, pulp materials, chemical fibers, natural fibers, asbestos or a mixture thereof. The separator 4 and the electrolytic solution supply member 9 may be independently formed. In the condition that the electrolytic solution is being supplied from the electrolytic solution supply member to the separator, they may be connected by a known connecting means.

The current collector 6 is a metal gauge that is made of nickel, copper, or the like and that has 340 to 330 meshes (that allow air to pass through). The current collector 6 is in contact with the positive electrode 3. A lead wire is soldered to an edge portion of the current collector 6.

The positive electrode 3 may be formed of a film mainly composed of petroleum graphite powder. The positive electrode 3 is porous. In addition, the positive electrode 3 is in contact with the current collector 6. The positive electrode 3 is produced in the following manner. Active carbon is added to the petroleum graphite powder. If necessary, a catalyst may be added to the mixture. Thereafter, a dispersed solution of polytetrafluoroethylene is added to the mixture and then mixed. The resultant mixture is thinly applied onto the current collector 6 and then heated. Thus, the positive electrode 3 is formed. When the positive electrode 3 is contacted with the current collector 6 in a film shape, an electrostatic coating method or the like may be used.

Figure 2:
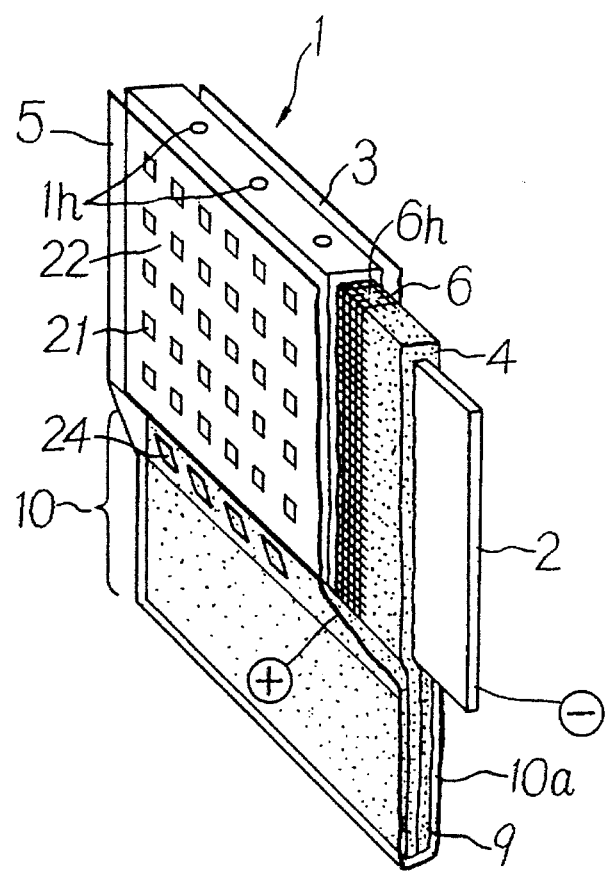
FIG. 2 is a partially exploded perspective view showing another embodiment of the single-cell type air cell according to the present invention.

FIG. 2 shows another embodiment of the single cell 1. For the simplicity, the description of the same portions as the embodiment shown in FIG. 1 is omitted. In the embodiment shown in FIG. 2, a separator 4, a current collector 6, and a positive electrode 3 surround a negative electrode 2. The current collector 6 and the positive electrode 3 have opening portions 6h and 1h that allow a gas such as $H_2$ that is produced by an air cell chemical reaction (which will be described later) to be exhausted therefrom, respectively.

On the other hand, the shape of the positive electrode 3 and the negative electrode 2 is preferably formed in a plane shape. In particular, since oxygen in air should easily diffuse and penetrate into the positive electrode 3, the positive electrode 3 is preferably formed in a U-letter shape (as shown in FIGS. 1 and 2) so that it surrounds the negative electrode 2. In addition, it should be noted that the single cell 1 may be formed in a rod shape or cylinder shape.

When the single cell 1 is produced, the current collector terminal is press-fit or welded to one edge of the planar negative electrode 2. A lead wire is connected to one edge of the current collector 6. Thereafter, the planar separator 4 is folded in half. The negative electrode 2 is inserted into the folded separator 4. The positive electrode 3 (which is a film mainly composed of petroleum graphite powder) is folded in half. The positive electrode 3 (current collector 6) is wrapped with the spacer 5 and the cover member 10. An upper portion (denoted by H in FIG. 1) of the cover member 10 is secured by a securing means such as a stapler. Opening portions are formed on both sides of the cover member 10. Thus, when the lower portion (corresponding to the cover member 10) of the single cell 1 (or an aggregated cell 13) is soaked in the electrolytic solution, it securely enters into and exits from the electrolytic solution supply member 9.

Figure 3A:
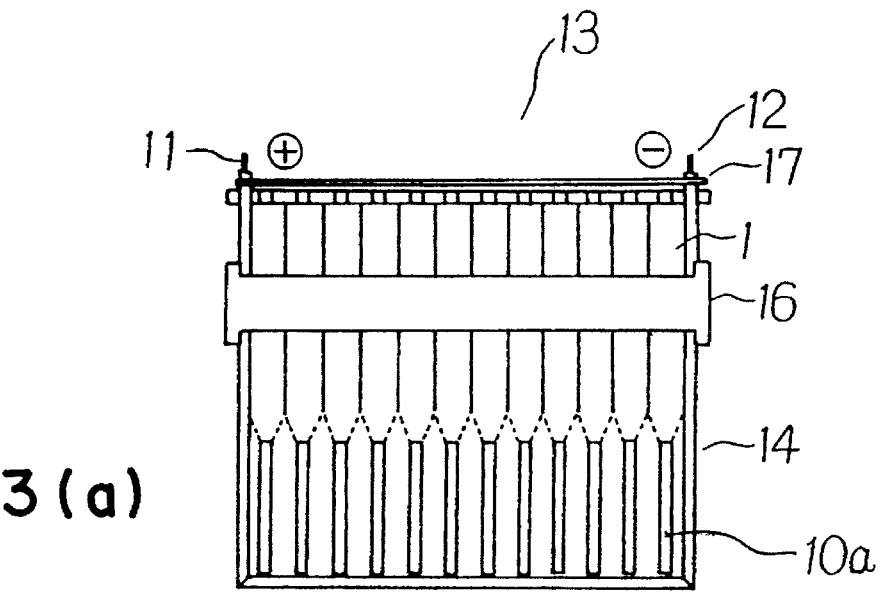
FIG. 3(a) is a front view showing an embodiment of an aggregated-cell type air cell according to the present invention.
Figure 3B:
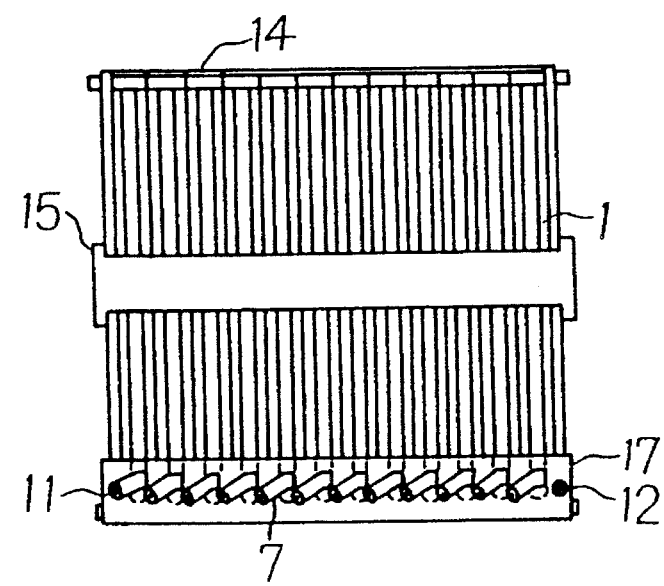
FIG. 3(b) is a top view of FIG. 3(a)
Figure 3C:
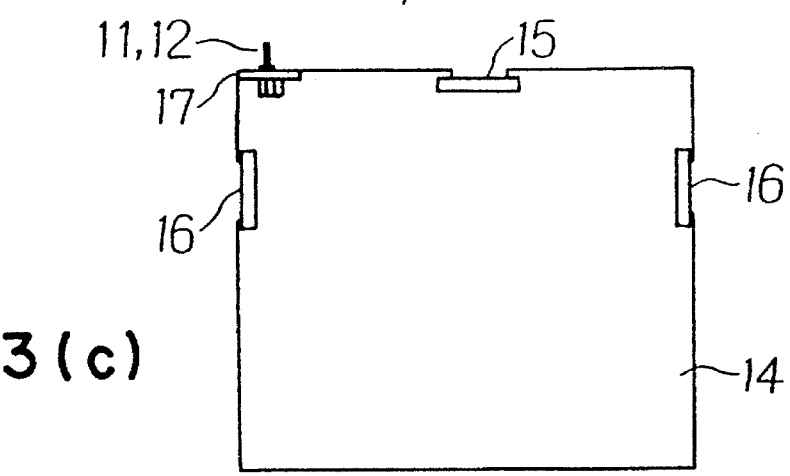
FIG. 3(c) is a side view of FIG. 3(a)

FIG. 3(a) is a plan view showing an aggregated cell 13 where a plurality of cells 1 are connected in series. FIG. 3(b) is a top view of FIG. 3(a). FIG. 3(c) is a side view of FIG. 3(a). Referring to FIGS. 3(a), (b), and (c), the cells 1 are connected in series through respective spacers. To hold the aggregated cells 1, a guard holder 14 is formed in a box shape. The guard holder 14 comprises a pair of side portions, an upper portion, and a bottom portion of the guard holder 14 that are made of water proof paper or plastic. A top tie bridge 15 is disposed at the upper portion of the guard holder 14 so as to reinforce the guard holder 14. In addition, a pair of side tie bridges 16 are disposed between the side surfaces of the guard holder 14. A negative electrode current collector terminal of a cell disposed at one edge position is connected to a "–" (minus) output terminal 12. A positive electrode current collector terminal 7 of a cell disposed at the other edge position is connected to a "+" (plus) output terminal 11. A plate 17 that fastens the current collector terminals 7 and 8 is disposed at an upper edge portion of the guard holder 14. As implied above, the surfaces on which the side tie bridges 16 are not covered by the guard holder (see FIG. 3(a)). Thus, when a lower portion (corresponding to the cover member 10) of the aggregated-cell type cell 13 is soaked in the electrolytic solution, it can freely enter into and exit from the electrolytic solution supply member.

Next, with reference to FIGS. 1 to 5, a spacer 5 and a cover member 10 according to the present invention will be described.

Since each of the cells 1, which construct the aggregated cell 13, require sufficient air, adjacent cells 1 should be spaced apart for a predetermined distance. The spacer 5 is provided so as to keep adjacent cells 1 apart for the predetermined distance. In other words, the spacer 5 should allow air to smoothly flow between the adjacent cells 1 so as to increase the output power of the air cell per unit time. Thus, the spacer 5 should provide proper air flow characteristics. In addition, while the air cell is being operated, the spacer 5 should have proper strength so as to keep the adjacent cell apart for the predetermined distance.

According to the present invention, the spacer 5 should have cavity portions and protrusion portions on at least one side thereof. When the spacer 5 is disposed adjacent to the positive electrode 3, it should have cavity portions and protrusion portions on at least a surface that faces the positive electrode 3. As long as the spacer has good machinability, heat resistance, and insulation, the material thereof is not limited. In other words, the spacer 5 may be composed of plastics such as polypropylene.

When the aggregated-cell type air cell 13 is soaked in the electrolytic solution, the cover member 10 covers the electrolytic solution supply member 9 of each of the cells 1 so as to suppress a shunt current that takes place in adjacent electrolytic solution supply members 9. If the electrolytic solution supply members 9 are not covered with the cover member 10, the shunt current flows between the electrolytic solution supply members 9 that are soaked in the electrolytic solution. Thus, energy loss takes place and thereby the output voltage of the air cell decreases. Consequently, the dischargeable time (battery life) is shortened. Thus, the cover member 10 is a very effective means for maintaining the output voltage of the air cell in a predetermined level. In addition, since the cover member 10 does not need to partition the electrolytic solution tank corresponding to the cells, the construction is much simpler than the other conventional means.

The material of the cover member 10 is the same as that of the spacer 5. Referring to FIG. 8, when the cover member 10 covers the electrolytic solution supply member 9 and cells 1a and 1b are soaked in an electrolytic solution 50, two opening portions 10a in which the electrolytic solution supply member 9 is in contact with the electrolytic solution 50 are formed on both edges of the cover member 10. As long as the cover member 10 properly covers the electrolytic solution supply member 9 and thereby substantially suppresses occurrence of the shunt current, the position and shape of the opening portions 10a are not limited.

The spacer 5 and the cover member 10 may be integrally or independently formed. In addition, the spacer 5 and the cover member 10 may be connected or disconnected when the electrode 2, 3 or electrolytic solution supply member 9 is covered. In the above-described embodiments according to the present invention, the spacer 5 and the cover member 10 are integrally formed. When the spacer 5 and the cover member 10 are integrally formed and composed of the same material, the production steps can be simplified and the production cost can be reduced.

Next, the spacer 5 and the cover member 10 that are integrally formed will be described in detail.

FIG. 4(a) is a developed view showing the spacer 5 that is disposed outside the cell 1 according to the embodiment (shown in FIG. 1). FIG. 4(b) is a horizontal sectional view taken along line I—I of FIG. 4(a). FIG. 4(c) is a vertical sectional view taken along line II—II of FIG. 4(a). Referring to FIGS. 4(a), (b), and (c), the spacer 5 has a large number of protrusion portions 21 on one side of a planar portion 20. Thus, the protrusion portions 21 form corresponding cavity portions 22. The spacer 5 is disposed adjacent to the cover member 10 that has air holes 24 through which air flows to the positive electrode 3. In addition, the spacer 5 has fold lines 23 that are formed in the horizontal direction. Along the fold lines 23, the spacer 5 can be folded. The cover member 10 according to this embodiment is integrally formed along with the spacer 5 by vacuum mold process or press process. However, the cover member 10 and the spacer 5 may be independently formed. In addition, the cover member 10 and the spacer 5 may be connected or disconnected so as to cover the electrode 2, 3 or the electrolytic solution supply member 9.

As shown in FIGS. 1 and 2, when the spacer 5 and the cover member 10 are folded so that they surround the negative electrode 2, the separator 4, and the positive electrode 3, the cell 1 is formed. At this point, the opening portions 10a are formed on both the edges of the cover member 10. Thus, the electrolytic solution 50 can be in contact with the electrolytic solution supply member 9 through the opening portions 10a (denoted by the arrow marks of FIG. 8). In addition, since an upper portion (above the liquid level of the electrolytic solution 50 in FIG. 8) of the opening portions 10a and both open edges of the spacer 5 are spaced apart from the separator 4, air is further supplied therefrom to the positive electrode 3.

Moreover, the spacer 5 and the cover member 10 cover and hold the negative electrode 2, the separator 4, the positive electrode 3, and so forth, which construct the cell.

On the other hand, as shown in FIG. 8, in the aggregated-cell type air cell 13, all the side surfaces 9a and the bottom surface 9b other than the opening portions 10a of the electrolytic solution supply member 9 of each of the cells 1 are covered by the cover member 10. Thus, the shunt current that flows between the electrolytic solution supply members 9 of the adjacent cells 1 through the electrolytic solution 50 and that causes the output voltage to drop can be very effectively suppressed. Consequently, as will be described later, test results show that the voltage drop remarkably varies depending on whether the cover member 10 is used or not. It is supposed that the travelling of ions in the electrolytic solution supply members 9 of the adjacent cells 1 is suppressed by the cover member 10.

Figure 5:
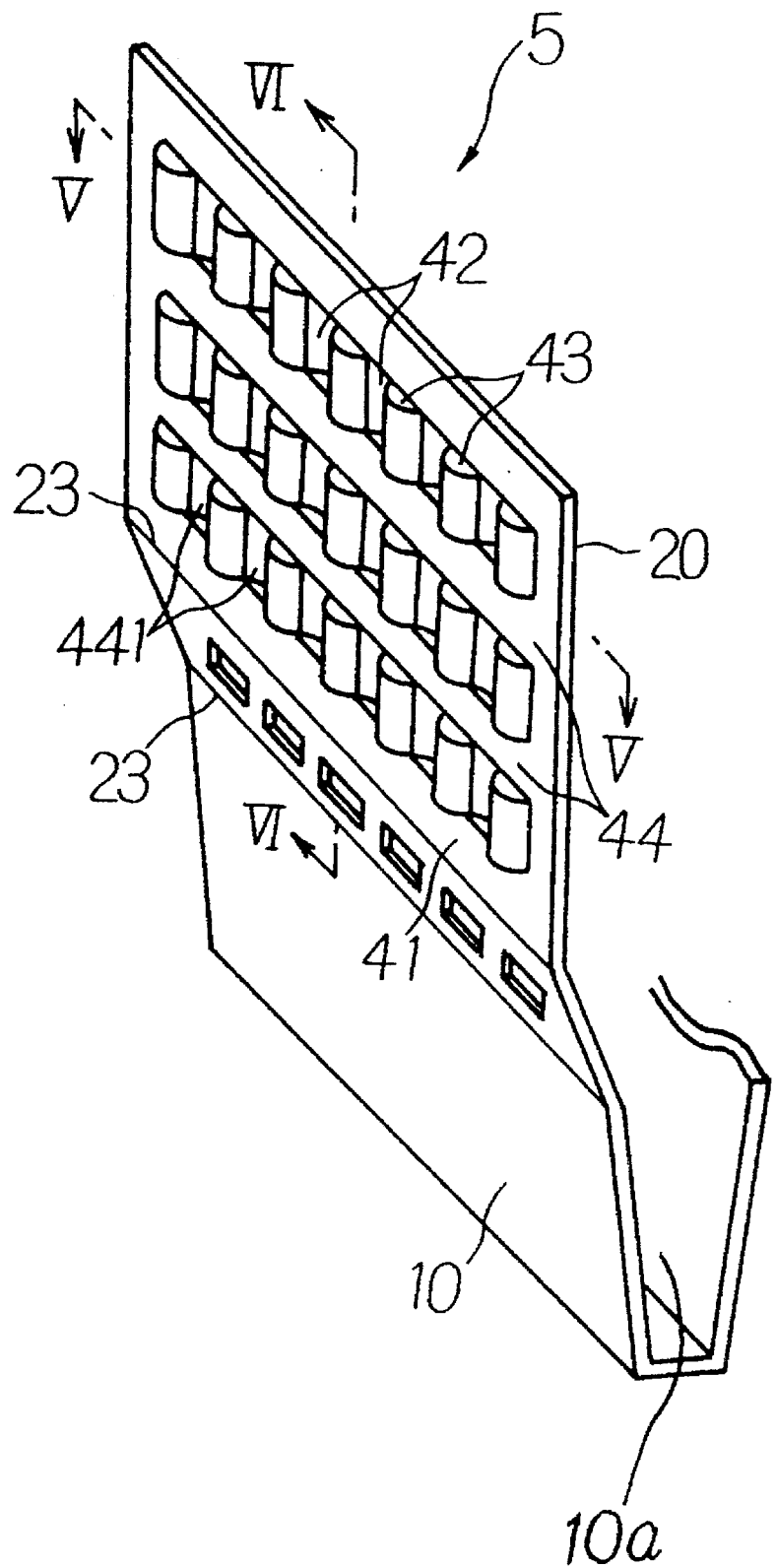
FIG. 5 is a perspective view showing another embodiment of the spacer for use with the air cell according to the present invention.

FIGS. 5 to 7 show another embodiment of the spacer 5 that has cavity portions and protrusion portions formed on both sides thereof.

FIG. 6(a) is a horizontal sectional view taken along line V—V of FIG. 5. FIG. 6(b) is a plan view of FIG. 5. FIG. 7(a) is a horizontal sectional view taken along line VI—VI of FIG. 5. FIG. 7(b) is a right side view of FIG. 5. In FIGS. 6 and 7, the cover member 10 that is integrally formed along with the spacer 5 is omitted.

Reference numeral 41 is a front surface of the spacer 5. On the front surface 41, cavity portions 42, protrusion portions 43, and air passageways 44 and 441 are formed. Reference numeral 46 is a rear surface of the spacer 5. On the rear surface 46, cavity portions 47, protrusion portions 48, and air passageways 49 and 491 are formed. The spacer 5 is formed by vacuum mold process or the like. The planar portion 20 other than the protrusion portions and the cavity portions are waved. On the rear side of the cavity portions 42 of the front surface 41, the protrusion portions 48 are formed. On the rear side of the protrusion portions 43 of the front surface 41, the cavity portions 47 are formed.

In FIG. 5, the cavity portions and the protrusion portions of the spacer 5 are formed in an arc shape. However, in FIGS. 6 and 7, for the simplicity, the cavity portions and protrusion portions of the spacer 5 are formed in a trapezoid shape. In other words, the cavity portions 42 and 47 and the protrusion portions 43 and 48 may be formed in for example an arc shape, a trapezoid shape, a triangle shape, or the like.

However, since the spacer 5 is disposed between each cell 1, the distance therebetween should be kept equal. Thus, since the spacer 5 always compresses each cell 1, the cavity portions and the protrusion portions are preferably formed of surfaces rather than points and lines.

In addition, the spacer 5 may be produced by other than the vacuum molding process. The construction and production method of the spacer 5 shown in FIGS. 6 and 7 are the same as those of the spacer 5 shown in FIG. 5. When the spacer 5 that is integrally formed along with the cover member 10 as shown in FIG. 4 is used, the present invention can be more effectively accomplished.

As described above, since the spacer 5 according to the present invention has the cavity portions and the protrusion portions on the front and rear surfaces thereof, it has proper air flow characteristics and practically large strength. In addition, the spacer 5 can be produced at low cost.

Next, with reference to the above-described embodiment, the operation of the air cell according to the present invention will be described.

Normally, when the air cell is not used, the positive electrode 3, the negative electrode 2, and so forth are not contacted with the electrolytic solution that is composed of NaCl, KCl, or the like. When the air cell is used, the electrolytic solution is properly supplied. Thus, before the air cell is used, power drop due to natural discharge or the like does not take place. Consequently, the preserving characteristics of the air cell are very high. In particular, the air cell can be used for an emergency power supply.

When the electromotive force of the air cell is required, the lower portion (corresponding to the cover member 10) of the aggregated-cell type air cell 13 is soaked with the electrolytic solution, which is composed of NaCl, KCl, or the like. As long as the conditions that the liquid level of the electrolytic solution does not exceed the height of the cover member 10, that the electrolytic solution does not contact the positive electrode 3 and the negative electrode 2, and that the electrolytic solution supply member 9 always contacts the electrolytic solution through the opening portions 10a are satisfied, the level of the electrolytic solution is not limited. The vessel that stores the electrolytic solution may be a case that corresponds to the shape of the aggregated-cell type air cell 13. Alternatively, the vessel may be a cup that stores the aggregated-cell type air cell 13. As another alternative way, another vessel such as a cooking pan may be used. In case of emergency, the cover member 10 may be soaked in water (containing electrolyte) of a puddle with a proper water level.

When a predetermined amount of the electrolytic solution is supplied, the following chemical reactions take place in the positive electrode 3.

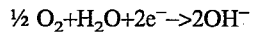

alternatively,

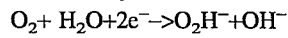

On the other hand, when a Mg alloy is used for the negative electrode 2, the following chemical reactions take place.

 (sub chemical reaction)

The above chemical reactions are the same as those of conventional batteries. When a load is connected to the air cell, electrons $e^-$ in the negative electrode 2 reach the positive electrode 3 through the load. In the positive electrode 3, the electrons $e^-$ are extinguished. Thus, a current flows from the positive electrode 3 to the negative electrode 2 through the load.

In the above-described embodiment, with respect to the spacer 5 and the cover member 10, the spacer 5 is inserted between adjacent cells 1 so that they are spaced apart for a predetermined distance. Air is sufficiently supplied to the positive electrode 3 through the passageways 44, 441, 49, 491, and the air holes 24 formed at the upper portion of the cover member 10. Thus, the above-mentioned chemical reactions can be satisfactorily performed in the positive electrode 3.

Referring to FIG. 5, the air passageways of the spacer 5 are formed in the horizontal and vertical directions. On the front surface 41, as is clear from FIG. 5, the air passageway 44 is formed in the horizontal direction. The air passageway 441 is formed in the vertical direction where the plane portion of the front surface 41 is connected to the cavity portion 42. On the rear surface 46, the air passageway 49 is formed in the horizontal direction as with the air passageway 44. The air passageway 491 is formed in the vertical direction where the plane portion of the rear surface 46 is connected to the cavity portion 47.

Since the spacer 5 is composed of plastics or the like, it is light weight and inexpensive. In addition, the spacer 5 can have proper strength with the cavity portions and the protrusion portions 42, 43, 47, and 48.

Even if the aggregated cell 13 is temporarily laid down, i.e., the electrolytic solution is spilt out of the vessel, it can keep the moisture of the electrolytic solution supply member 9, which is composed of a water absorbing material, and the cover member 10 can prevent the moisture from being evaporated from the front surface of the electrolytic solution supply member 9. Thus, since the electrolytic solution can be kept for a predetermined time period, the electrolytic solution can be supplied between the negative electrode 2 and the positive electrode 3 through the separator 4. Consequently, even if the air cell is laid down, the power generation is not stopped. This applies to the single-cell type air cell.

According to the present invention, it is not necessary to airtightly construct the aggregated-cell type air cell 13. Thus, the air cell is light. In other words, since the air cell according to the present invention is of almost fully-open type, it has high air flow characteristics and high performance.

Figure 9:
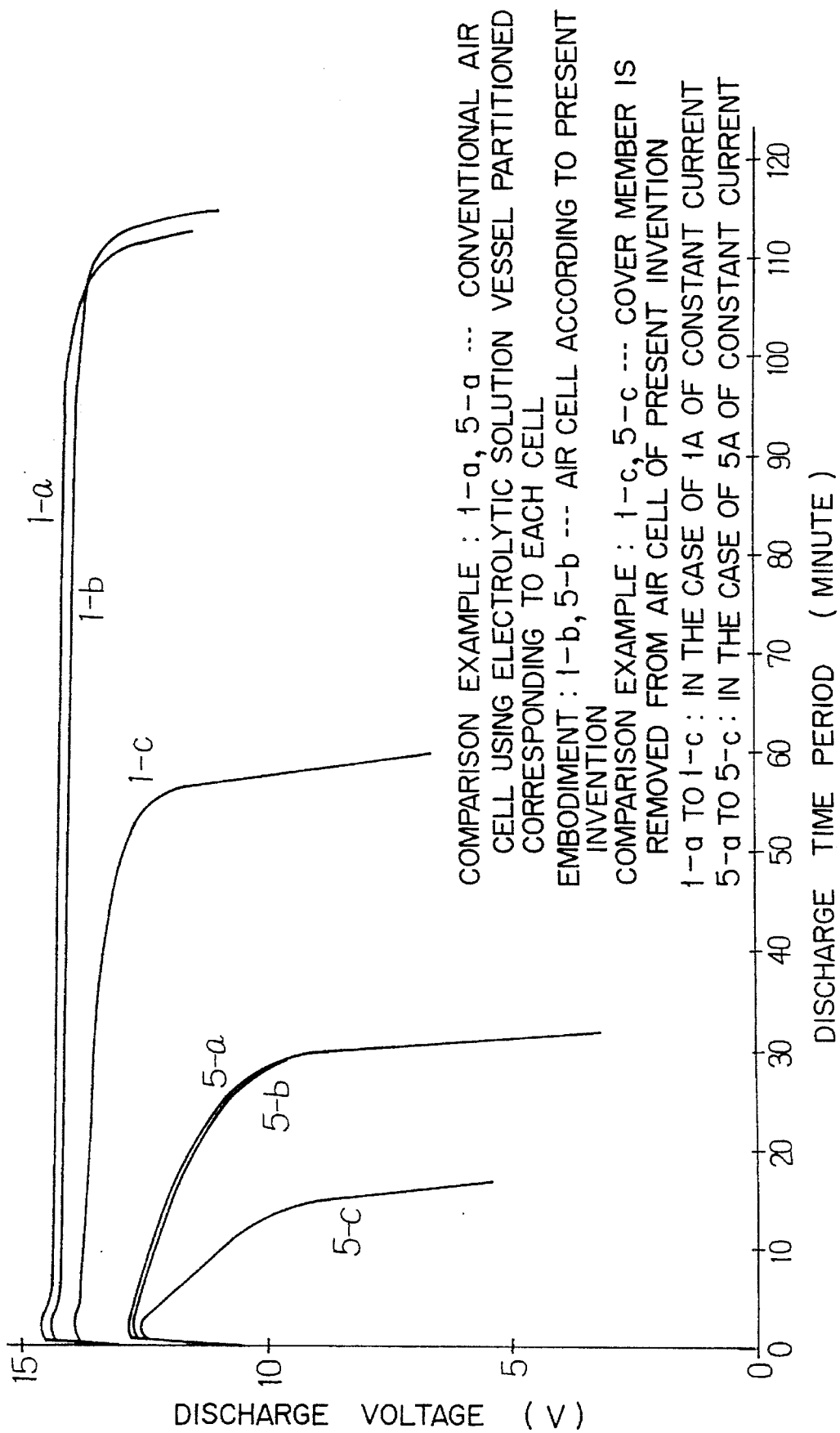
FIG. 9 is a graph showing constant current discharge characteristics of the air cell according to the present invention.

FIG. 9 is a graph showing results of a constant current discharging test. In this test, the aggregated-cell type air cell 13 is constructed of ten cells 1 that are connected in series. Each of the cells 1 comprises the positive electrode 3 composed of graphite powder and others, the negative electrode 2 composed of magnesium, the separator 4 (electrolytic solution supply member 9) composed of glass wool, and the spacer 5 (cover member 10) composed of polypropylene sheet. The bottom portion of the cover member 10 (with a length of approximately 7 cm) was soaked in the electrolytic solution (10% of NaCl) for approximately 2 cm. In these conditions, a constant current discharge test was conducted. Along with the above-described embodiment, comparison examples 1 and 2 were prepared. In the comparison example 1, each cell 1 was soaked in an electrolytic solution stored in an electrolytic solution vessel whose bottom portion was partitioned corresponding to each cell. Thus, in the comparison example 1, the amount of the shunt current was logically zero. In addition, the electrolytic solution contained in the absorbing member penetrates through the separator 4. In the comparison example 2, the cover member 10 of the spacer 5 was removed from the aggregated cell 13 according to the above-described embodiment of the present invention. As is clear from the graph shown in FIG. 9, test results show that the voltage maintaining time (constant current discharging of 1 A or 5 A) according to the embodiment of the present invention is nearly the same as that of the comparison example 1, where the amount of shunt current is nearly zero. In addition, the test results show that the cover member 10 of the present invention effectively suppresses the voltage drop caused by the shunt current that takes place due to the electrolytic solution supply member 9.

In the above-described embodiment, as the electrolytic solution, NaCl solution was used. However, it should be noted that another electrolytic solution such as KCl solution, seawater, or salty water may be used.

In the above-described embodiment, the positive electrode 3 was made of petroleum graphite powder and others. However, it is also noted that graphites other than petroleum graphite powder may be used for the positive electrode 3.

The air cell according to the present invention is of almost fully open type. Thus, the overall weight of the air cell is low. In addition, since the air cell according to the present invention does not need a special vessel (electrolytic solution soaking vessel) for supplying an electrolytic solution to each cell 1, a predetermined amount of the electrolytic solution can be very easily supplied.

Since the air cell according to the present invention is small, light weight, and high power cell, it can be widely used as an instant power supply for an emergency charging power supply for a car, an energy source for a model airplane and the like, an outdoor power supply used for camping and fishing (since the air cell does not produce noise unlike with a power generator, it does not frighten fish).

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. An air cell having a single cell, comprising:
   a positive electrode;
   a negative electrode;
   a separator disposed between said positive electrode and said negative electrode and composed of a water absorbing material that absorbs and holds an electrolytic solution;
   an electrolytic solution supply member protrusively disposed at a lower edge of said positive electrode and said negative electrode and which supplies the electrolytic solution to said separator;
   a spacer for covering an outer surface of said positive electrode and said negative electrode and forming an air layer on the front surface thereof; and
   a cover member for covering surfaces of said electrolytic solution supply member, said cover member having a blank portion that is at least a minimum opening portion for supplying the electrolytic solution to said electrolytic solution supply member.

2. The air cell as set forth in claim 1, wherein said separator and said electrolytic solution supply member are integrally formed.

3. The air cell as set forth in claim 1 or 2, wherein said separator is made of glass papers, pulp materials, chemical fibers, natural fibers, asbestos, glass fibers or a mixture thereof.

4. The air cell as set forth in claim 1, wherein said cover member has an opening portion corresponding to an upper edge of said electrolytic solution supply member.

5. The air cell as set forth in claim 1, wherein said spacer and said cover member are integrally formed.

6. The air cell as set forth in one of claims 1, 2, 4 or 5, wherein the air cell is constructed of a plurality of the cells, each of which is connected through said spacer and said cover member.

7. The air cell as set forth in claim 6, wherein the cells are connected in series or in parallel.

8. The air cell as set forth in claim 6, further comprising a current collector that is in contact with said positive electrode.

9. The air cell as set forth in claim 6, wherein a plurality of cavity portions and protrusion portions are formed on an least one side of said spacer.

10. The air cell as set forth in claim 1, further comprising a current collector that is in contact with said positive electrode.

11. The air cell as set forth in claim 1, wherein a plurality of cavity portions and protrusion portions are formed on at least one side of said spacer.

* * * * *